United States Patent
Wang

(10) Patent No.: US 10,378,273 B2
(45) Date of Patent: *Aug. 13, 2019

(54) SOUNDPROOF DOOR FOR USE IN REDUCTION OF SOUND TRANSMITTED FROM ONE SIDE OF THE DOOR TO THE OTHER SIDE

(71) Applicant: Nan Ya Plastics Corporation, Taipei (TW)

(72) Inventor: Kuei-Yung Wang, Taipei (TW)

(73) Assignee: NAN YA PLASTICS CORPORATION (TW)

( * ) Notice: Subject to any disclaimer, the term of this patent is extended or adjusted under 35 U.S.C. 154(b) by 0 days.

This patent is subject to a terminal disclaimer.

(21) Appl. No.: 16/100,622

(22) Filed: Aug. 10, 2018

(65) Prior Publication Data

US 2018/0347264 A1    Dec. 6, 2018

Related U.S. Application Data

(63) Continuation-in-part of application No. 15/277,475, filed on Sep. 27, 2016, now Pat. No. 10,113,355, (Continued)

(51) Int. Cl.
*E06B 5/20* (2006.01)
*E04B 1/86* (2006.01)
(Continued)

(52) U.S. Cl.
CPC .............. *E06B 5/20* (2013.01); *E04B 1/86* (2013.01); *E06B 3/822* (2013.01); *B32B 7/12* (2013.01);
(Continued)

(58) Field of Classification Search
CPC ...... E06B 5/20; E04B 1/86; E04B 2001/8461; G10K 11/168; B32B 2307/102; B32B 7/12; B32B 2419/00
See application file for complete search history.

(56) References Cited

U.S. PATENT DOCUMENTS 2,922,202 A    1/1960  Kodaras
3,120,295 A    2/1964  Lemmerman
(Continued)

FOREIGN PATENT DOCUMENTS

EP    2194220 A2 *  9/2010

*Primary Examiner* — Brent W Herring
(74) *Attorney, Agent, or Firm* — Ostrolenk Faber LLP

(57) ABSTRACT

A soundproof door assembly for use in reduction of sound transmitted from one side of the door to the other side, having an STC number at least STC 36 determined in accordance with ASTM E413-10 and E90-09, comprising a soundproof door having a thickness of 30-80 mm, which comprising two door skins, one formed as a front door skin and the other formed as a rear door skin for the soundproof door respectively; a quadrilateral frame, constituted by a top rail member, a bottom rail member, a left stile member and a right stile member to seal the perimeter of the door skins; and a multiple-layered core, to form a concrete inner portion of the door, which comprising three layers of a hard-soundproof material that blocks sound with high frequency over 500 Hz, wherein each of the door skins includes an aperture aligned and devoid of any soundproofing core thereby forms a window of the soundproof door for accommodation of a glass pane.

18 Claims, 12 Drawing Sheets

Related U.S. Application Data which is a continuation-in-part of application No. 14/808,351, filed on Jul. 24, 2015, now abandoned.

(51) Int. Cl.
*E06B 3/82* (2006.01)
*G10K 11/168* (2006.01)
*E04B 1/84* (2006.01)
*B32B 7/12* (2006.01)
*E06B 3/70* (2006.01)

(52) U.S. Cl.
CPC ..... *B32B 2307/102* (2013.01); *B32B 2419/00* (2013.01); *E04B 2001/8461* (2013.01); *E06B 3/7001* (2013.01); *E06B 2003/7023* (2013.01); *E06B 2003/7025* (2013.01); *E06B 2003/7032* (2013.01); *E06B 2003/7063* (2013.01); *E06B 2003/7071* (2013.01); *G10K 11/168* (2013.01)

(56) References Cited

U.S. PATENT DOCUMENTS

| | | | |
|---|---|---|---|
| 3,273,297 A | 9/1966 | Wehe, Jr. | |
| 3,295,273 A | 1/1967 | Wehe, Jr. | |
| 3,950,894 A | 4/1976 | DiMaio | |
| 4,307,543 A | 12/1981 | Schulthess | |
| 6,318,036 B1 | 11/2001 | Siudzinski et al. | |
| 6,401,428 B1 | 6/2002 | Glover et al. | |
| 6,681,541 B2 | 1/2004 | Wang Chen | |
| 7,181,891 B2 * | 2/2007 | Surace | B32B 7/12 52/642 |
| 8,074,766 B1 | 12/2011 | Shore et al. | |
| 8,181,417 B2 * | 5/2012 | Surace | B32B 7/12 52/642 |
| 8,573,357 B1 | 11/2013 | Hibbs | |
| 9,051,731 B2 | 6/2015 | Thomas et al. | |
| 9,375,899 B2 * | 6/2016 | Daniels | B32B 13/02 |
| 2002/0032995 A1 * | 3/2002 | Siudzinski | E06B 1/28 52/207 |
| 2003/0005645 A1 | 1/2003 | Wang Chen | |
| 2003/0200714 A1 * | 10/2003 | Minke | B28B 1/14 52/423 |
| 2004/0231914 A1 | 11/2004 | Thompson, Jr. et al. | |
| 2004/0231915 A1 | 11/2004 | Thompson, Jr. et al. | |
| 2005/0050846 A1 | 3/2005 | Surace et al. | |
| 2006/0096240 A1 | 5/2006 | Fortin | |
| 2006/0289230 A1 | 12/2006 | Connelly et al. | |
| 2007/0094950 A1 * | 5/2007 | Surace | B32B 7/12 52/144 |
| 2008/0196971 A1 | 8/2008 | Charbonnier et al. | |
| 2009/0178882 A1 | 7/2009 | Johnson | |
| 2010/0066121 A1 | 3/2010 | Gross | |
| 2010/0180526 A1 | 7/2010 | An et al. | |
| 2010/0281805 A1 | 11/2010 | Garrett et al. | |
| 2011/0131921 A1 | 6/2011 | Chen | |
| 2012/0272601 A1 * | 11/2012 | Mouskis | E06B 3/7003 52/458 |
| 2013/0025966 A1 | 1/2013 | Nam et al. | |
| 2013/0061522 A1 | 3/2013 | Alexander et al. | |
| 2013/0133261 A1 | 5/2013 | Choi | |
| 2013/0209782 A1 | 8/2013 | Kipp et al. | |
| 2013/0228271 A1 * | 9/2013 | Garrett | E06B 3/822 156/242 |
| 2014/0000194 A1 | 1/2014 | Daniels et al. | |
| 2014/0000195 A1 | 1/2014 | Daniels et al. | |
| 2014/0054107 A1 | 2/2014 | Thomas et al. | |
| 2014/0202789 A1 | 7/2014 | Heurtaux et al. | |
| 2015/0068838 A1 | 3/2015 | Keene | |
| 2016/0075108 A1 | 3/2016 | Temblay | |
| 2016/0303826 A1 * | 10/2016 | Daniels | B32B 13/02 |
| 2017/0016272 A1 * | 1/2017 | Ferguson | E06B 3/6707 |

* cited by examiner

SOUNDPROOF DOOR FOR USE IN REDUCTION OF SOUND TRANSMITTED FROM ONE SIDE OF THE DOOR TO THE OTHER SIDE

CROSS REFERENCE TO RELATED APPLICATIONS

This application is a continuation-in-part of U.S. patent application Ser. No. 15/277,475, filed Sep. 27, 2016, which is a continuation-in-part of U.S. patent application Ser. No. 14/808,351, filed Jul. 24, 2015, now abandoned, the contents of both of which are incorporated herein by reference.

FIELD OF THE INVENTION

The present invention relates to a closure member for use in reduction of sound transmission and improving resistance of impact, for example particularly, but not exclusively, an improved soundproof impact sheet mold compound door.

BACKGROUND OF THE PRESENT INVENTION

The present invention relates to a soundproof door, and more particularly, to an improved soundproof door having an STC number greater than of STC 30 and at least STC36 determined in accordance with ASTM E413-10 and E90-09.

A soundproof door is a door which has been designed or retrofitted to cut out as much external noise as possible. However, most soundproof doors currently used in prior art are wooden doors or synthesized plastic doors, those doors are poor in sound isolation or acoustic insulation.

Soundproof sheet mold compound door made of wood material that is poor in reduction of sound transmission and are relatively likely to deform. To solve the problem metal is used in the formation of the door, which is proven to offer better reduction of sound transmission through the door. However the use of metal escalate the overall costs in building or forming the door.

The invention seeks to eliminate or at least to mitigate such shortcomings by providing an improved soundproof impact sheet mold compound door.

SUMMARY OF THE INVENTION

The major purpose of the present invention is to provide an improved soundproof door for use in reduction of sound transmitted from one side of the door to the other side, which improvement includes the soundproof door has a multiple-layered core to form a concrete inner portion of the soundproof door, the multiple-layered core particularly constituted by having a soft-soundproofing core interleaved in between two spaced hard-soundproofing cores to form as a whole as a sandwich structure are excellent in sound isolation for soundproof door, and the soundproof door at least has an STC of 30 determined in accordance with ASTM E413-10 and E90-09, so that the soundproof door may minimize the transmission of sound from one side of the soundproof door to the other side.

The structural composition of the soundproof door comprises two door skins one formed as a front door skin and the other formed as a rear door skin for the soundproof door respectively; a quadrilateral frame constituted by a top rail member, a bottom rail member, a left stile member and a right stile member to seal the perimeter of the door skins; and a multiple-layered core having function of sound isolation to form a concrete inner portion of the door, wherein the multiple-layered core comprises two spaced hard-soundproofing cores and a soft-soundproofing core interleaved in between the spaced hard-soundproofing cores to constitute with a sandwich structure.

The above-mentioned soundproof door may further comprises one or more reinforced members in parallel set up alongside one or more sides of the soft-soundproofing core, and both the soft-soundproofing core and each the reinforced member are interleaved in between the two spaced hard-soundproofing cores to constitute with a sandwich structure.

Another structural composition of the soundproof door comprises two door skins one formed as a front door skin and the other formed as a rear door skin for the soundproof door respectively; a quadrilateral frame constituted by a top rail member, a bottom rail member, a left stile member and a right stile member to seal the perimeter of the door skins; one or more reinforced members in parallel set up alongside one or more inner sides of the quadrilateral frame; and a multiple-layered core having function of sound isolation to form a concrete inner portion of the door, wherein the multiple-layered core comprises two spaced hard-soundproofing cores and a soft-soundproofing core interleaved in between the spaced hard-soundproofing cores to constitute with a sandwich structure.

The hard-soundproofing core may be made of either a single-layered soundproofing core or a multiple-layered soundproofing core constituted by two or more the single-layered soundproofing cores.

The hard-soundproofing core is made of wood plate, iron plate, calcium silicate board, gypsum board, magnesium oxide board, silicon magnesium board, glass fiber composite board or ceramic composite board.

The soft-soundproofing core is made of rock wool fiber board, ceramic fiber wool board, phenolic foaming board, glass fiber board, closed cell polyurethane foaming board, opened cell polyurethane foaming board, expandable polystyrene foaming board or expandable polyethylene foaming board.

The reinforced member is made of hard PVC board, PVC composite extrusion board, PS board, ABS board, hardwood board, high density particle board or LVL board.

In an aspect of the invention there is provided a soundproof door assembly for use in reduction of sound transmitted from one side of the door to the other side, having an STC number at least STC 36 determined in accordance with ASTM E413-10 and E90-09, comprising a soundproof door having a thickness of 30-80 mm, which comprising two door skins, one formed as a front door skin and the other formed as a rear door skin for the soundproof door respectively; a quadrilateral frame, constituted by a top rail member, a bottom rail member, a left stile member and a right stile member to seal the perimeter of the door skins; and a multiple-layered core, to form a concrete inner portion of the door, which comprising three layers of a hard-soundproof material that blocks sound with high frequency over 500 Hz, wherein each of the door skins includes an aperture aligned and devoid of any soundproofing core thereby forms a window of the soundproof door for accommodation of a glass pane. Preferably, the soundproof door has a thickness of 44-45 mm. More preferably, the three layers comprises first and second layers of 15.5 mm thickness sandwiching a third layer. Yet more preferably, the third layer has a thickness of 8 mm. It is preferable that each of the door skins has a thickness of 2.5 mm. Advantageously, the hard-soundproofing core is a material selected from a group consisting solid wood, lumber, veneer core plywood, oriented strand board, calcium citrate, gypsum, silica, glass fiber and magnesium oxide. More advantageously, the first and second layers comprise solid wood and the third layer comprises calcium citrate board, the layers are fixed to each other by way of adhesive. It is advantageous that the first and second layers are made of a same material. Yet more advantageously the door further comprises reinforcement member provided with the core for enhancing mechanical strength of the overall door. It is preferable that the aperture accommodates a pane of glass. More preferably, the pane of glass comprises Cardinal Laminated Glass LoE 366. Yet more preferably, the front and rear door skin comprises resin. It is preferable that the resin comprises polyester resin. Advantageously, the polyester resin comprises unsaturated polyester resin. More advantageously, the unsaturated polyester resin comprises fiberglass reinforced plastic. Yet more advantageously, the resin includes at least one layer of fiberglass cloth. Preferably, The soundproof door assembly is an impact door satisfying the ASTM E1996 test.

In another aspect of the invention, there is provided a method of forming a soundproof door comprising the step of providing front and rear skins by way of sheet moulding from a glass-fiber reinforced polyester material; providing a core by laminating three layers of hard-soundproof materials that blocks sound with high frequency over 500 Hz; adhesively bonding the front and rear skins to the core;wherein each of the door skins includes an aperture aligned and devoid of any soundproofing core thereby forms a window of the soundproof door for accommodation of a glass pane. More preferably, the pane of glass comprises Cardinal Laminated Glass LoE 366. Yet more preferably, the hard-soundproof materials is selected from a group of material consisting solid wood, lumber, veneer core plywood, oriented strand board, calcium citrate, gypsum, silica, glass fiber and magnesium oxide. It is preferable that the three layers of hard-soundproof materials comprises first and second layers sandwiching a third layer, relative positions of the layers is fixed by way of adhesive. Advantageously, the thickness of each of the front and rear skins is 2.5 mm. More advantageously, the thickness of each of the first and second layers is 15.5 mm and the thickness of the third layer is 8 mm. It is advantageous that the first and second layers comprise solid wood and the third layer comprises calcium citrate. Preferably, the step of cutting the core into pieces and laying the pieces on the front skin while avoiding the aperture on the front skin. More preferably, the method further comprises the step of placing the rear skin onto the core with the apertures in the front and rear skin aligned.

DETAILED DESCRIPTION OF THE INVENTION

Figure 1:
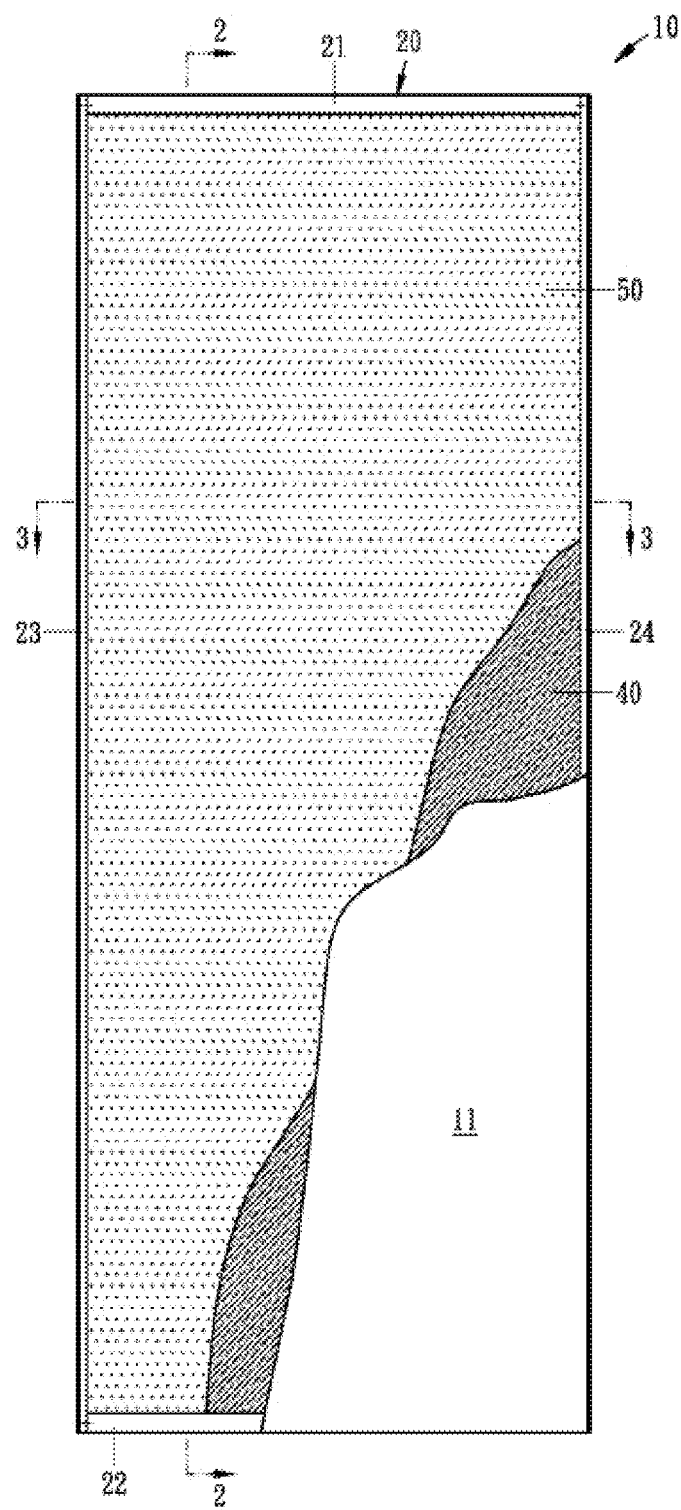
FIG. 1 is a schematic drawing of the soundproof door of the invention.
Figure 3:
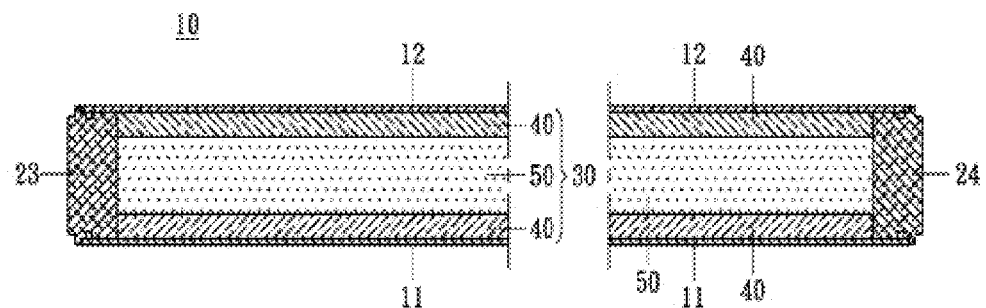
FIG. 3 is a partial enlargement of cross-sectional drawing along line 3-3 of the soundproof door in FIG. 1.
Figure 2:
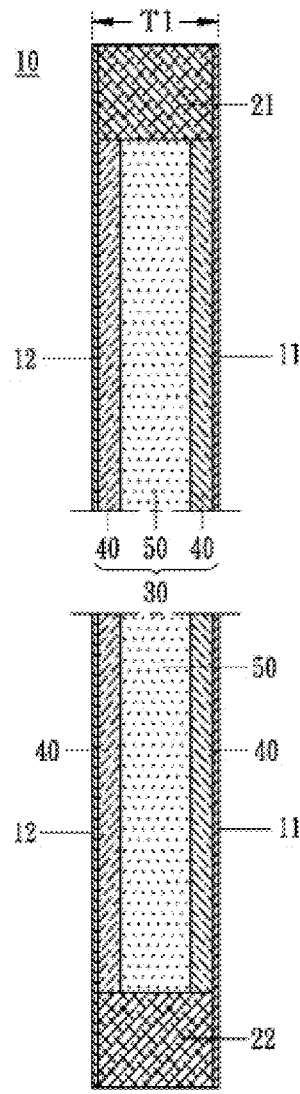
FIG. 2 is a partial enlargement of cross-sectional drawing along line 2-2 of the soundproof door in FIG. 1.

As shown in from FIG. 1 to FIG. 3, a soundproof door 10 disclosed in this present invention has a total thickness T1 ranged from 30 mm to 70 mm and comprises two door skins 11 and 12 formed as a front door skin and a rear door skin for the soundproof door 10 respectively, a quadrilateral frame 20 constituted by a top rail member 21, a bottom rail member 22, a left stile member 23 and a right stile member 24 to seal the perimeter of door skins 11 and 12 of the soundproof door 10, and a multiple-layered core 30 to form a concrete inner portion of the soundproof door 10.

Figure 7:
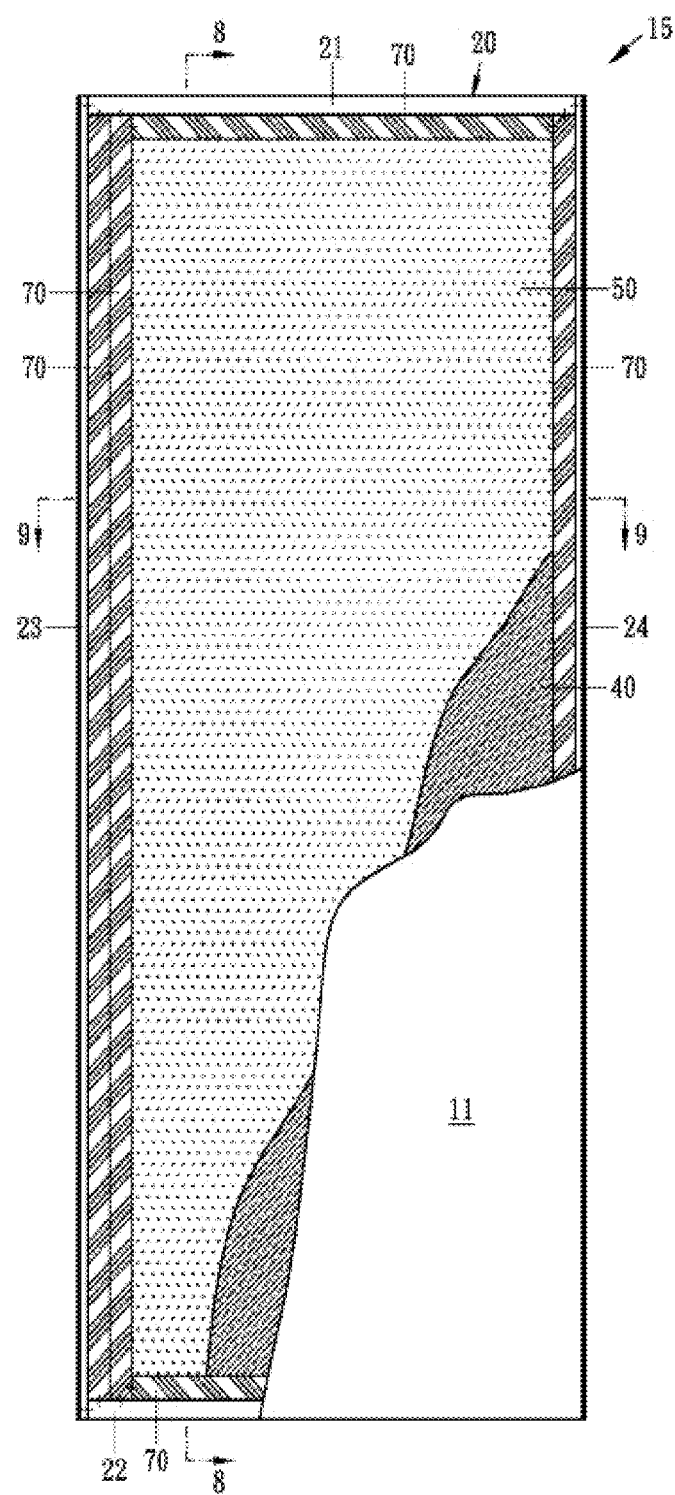
FIG. 7 is a schematic drawing of further another embodiment of the soundproof door of the invention.
Figure 9:
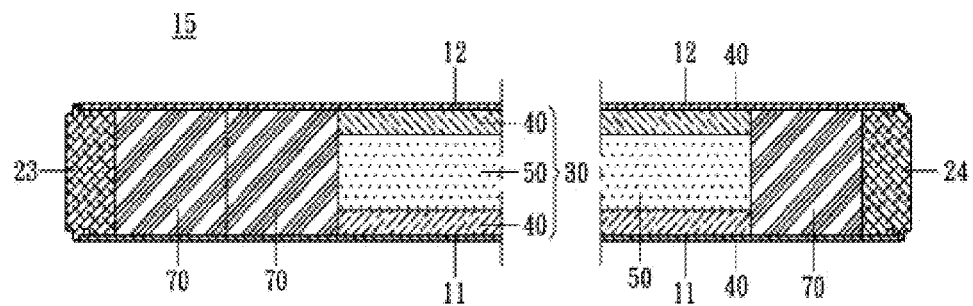
FIG. 9 is a partial enlargement of cross-sectional drawing along line 9-9 of the soundproof door in FIG. 7.
Figure 8:
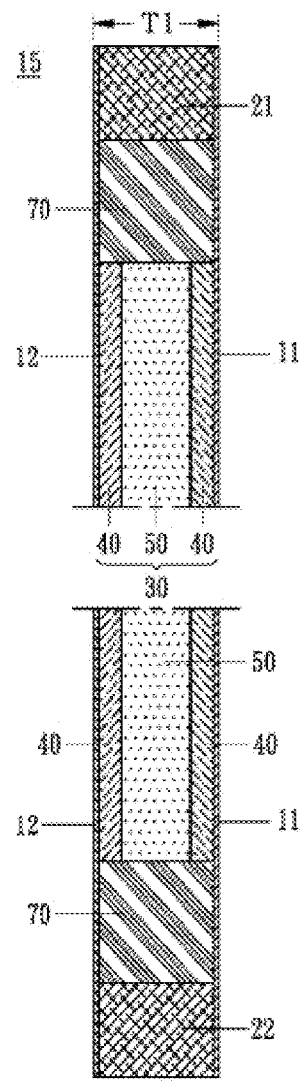
FIG. 8 is a partial enlargement of cross-sectional drawing along line 8-8 of the soundproof door in FIG. 7.

As shown in from FIG. 7 to FIG. 9, another embodiment of the soundproof door 15 of the present invention still has a total thickness T1 ranged from 30 mm to 70 mm and comprises the door skins 11 and 12 of the soundproof door 15, the quadrilateral frame 20 to seal the perimeter of door skins 11 and 12, one or more reinforced members 70 in parallel set up alongside one or more inner sides of the quadrilateral frame 20 of the soundproof door 15, and the multiple-layered core 30 to form a concrete inner portion of the soundproof door 15.

Particularly, the multiple-layered core 30 of the soundproof door 10 or 15 of the present invention has function of sound isolation to minimize the transmission of sound from one side of the soundproof door 10 or 15 to the other side.

The door skin 11 or 12 has a thickness of 1-5 mm and is made of fiber reinforced plastic (FRP) sheet, SMC sheet, BMC sheet, wood plate, iron plate, PVC sheet, PS sheet, ABS sheet or laminated veneer lumber (LVL) sheet. Wherein the SMC sheet is made of fiber reinforced plastic (FRP) by sheet molding compound method, and the BMC sheet is made of fiber reinforced plastic (FRP) by Bulk Molding Compound method.

Figure 10:
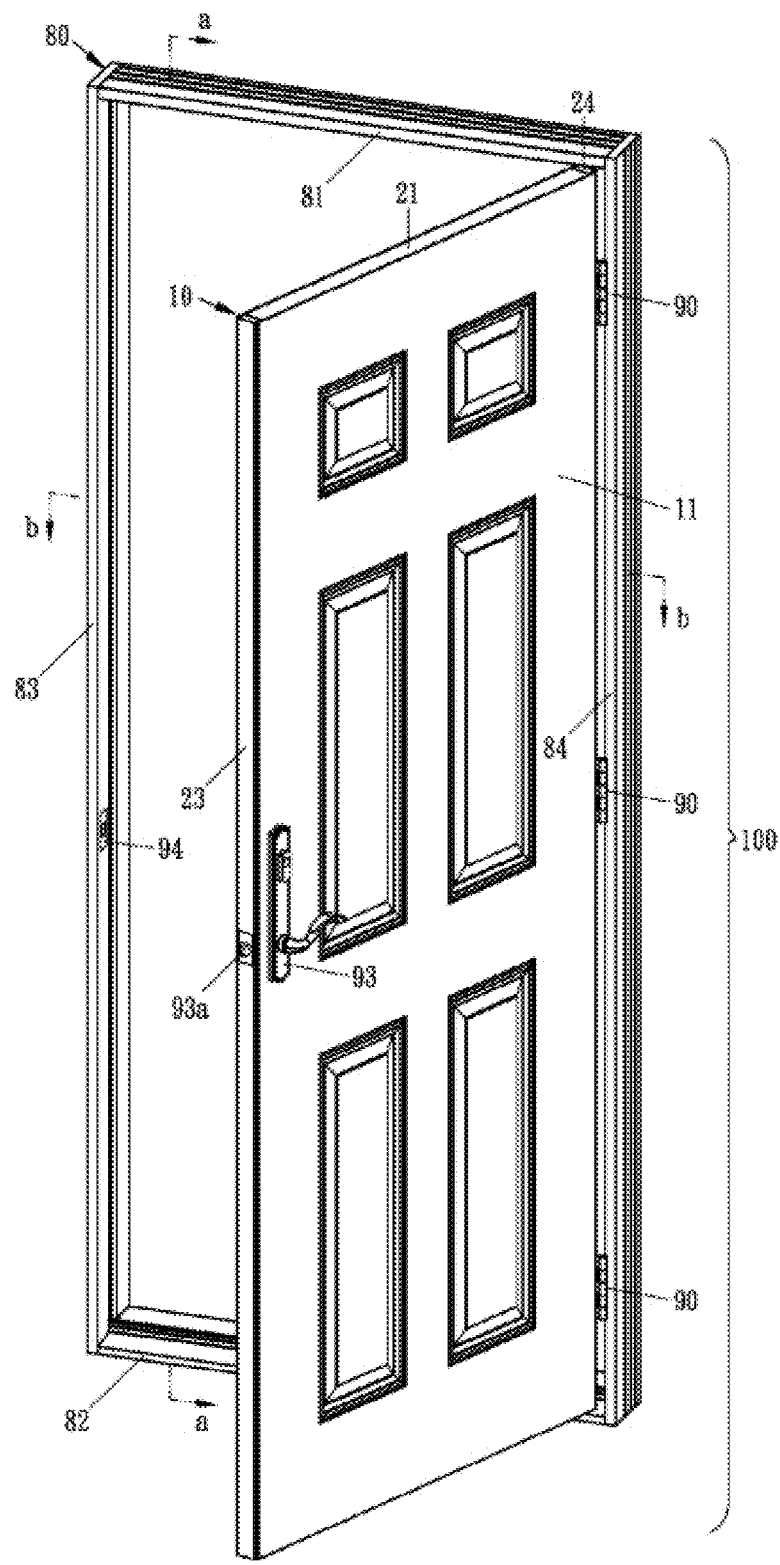
FIG. 10 is a schematic drawing of the soundproof door assembly of the invention.

Further, the door skin 11 or 12 can be shaped either as a flat door skin of which door surface is a flat surface or as a panel door skin of which door surface as depicted in FIG. 10 has decorative panel patterns formed on the door surface. The door skin 11 or 12 may have a smooth surface without wood grain or with imitating wood grain. The door skin 11 or 12 may have a rough back surface for increasing the binding force when they are bond together with the quadrilateral frame 20 and the multiple-layered core 30, or further with the reinforced member 70.

The quadrilateral frame 20 including the top rail member 21, the bottom rail member 22, the left stile member 23 and the right stile member 24 is made of hard PVC board, foamed PVC board, PVC composite extrusion board, hardwood board, high density particle board, laminated veneer lumber (LVL) board, stainless steel plate, galvanized and coated steel plate or calcium silicate plate.

The multiple-layered core 30 at least comprises two spaced hard-soundproofing cores 40 and a soft-soundproofing core 50 interleaved in between the two spaced hard-soundproofing cores 40 to constitute with a sandwich structure.

Figure 4:
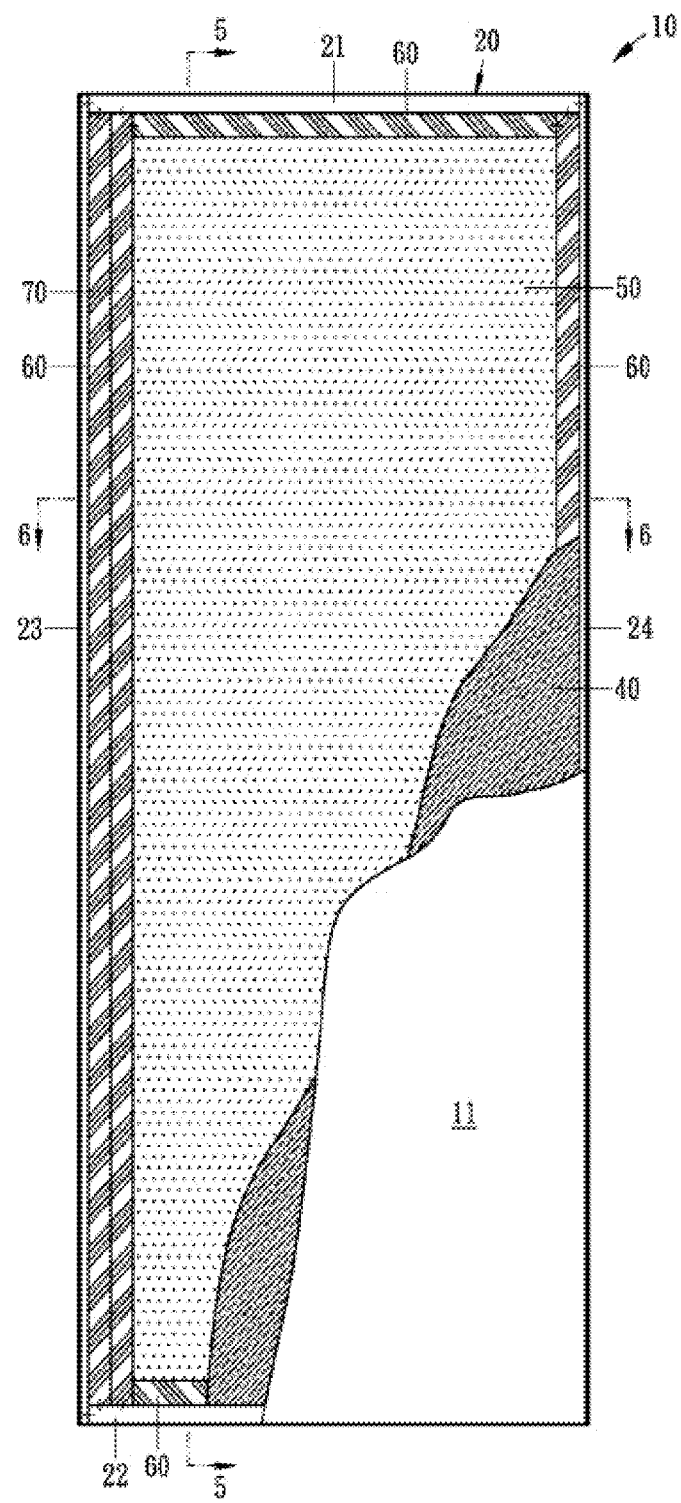
FIG. 4 is a schematic drawing of another embodiment of the soundproof door of the invention.
Figure 6:
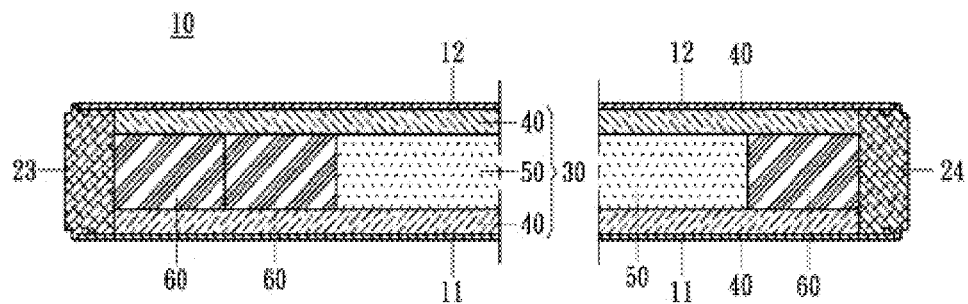
FIG. 6 is a partial enlargement of cross-sectional drawing along line 6-6 of the soundproof door in FIG. 4.
Figure 5:
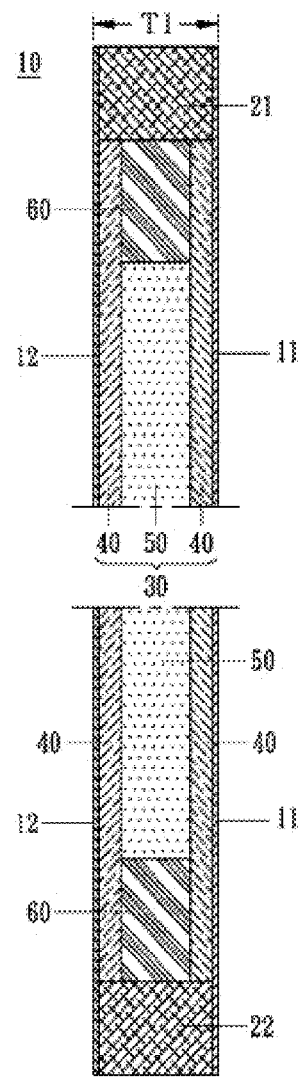
FIG. 5 is a partial enlargement of cross-sectional drawing along line 5-5 of the soundproof door in FIG. 4.

As shown in from FIG. 4 to FIG. 6, another practical embodiment of the multiple-layered core 30 comprises the two spaced hard-soundproofing cores 40, the soft-soundproofing core 50 and one or more reinforced members 60 in parallel set up alongside one or more sides, preferably each side, of the soft-soundproofing core 50 thereof, and in particular both the soft-soundproofing core 50 as well as the reinforced member 60 are interleaved in between the two spaced hard-soundproofing cores 40 to constitute with a sandwich structure.

The hard-soundproofing core 40 has a thickness of 3-12 mm and is made of either a single-layered soundproofing core or a multiple-layered soundproofing core constituted by two or more the single-layered soundproofing cores.

The hard-soundproofing core 40 has an excellent soundproofing ability to preferably block sound with high frequency over 500 Hz and is made of wood plate, iron plate, calcium silicate board, gypsum board, magnesium oxide board, silicon magnesium board, glass fiber composite board or ceramic composite board.

The soft-soundproofing core 50 has an excellent soundproofing ability to preferably block sound with low frequency beneath 500 Hz and is made of rock wool fiber board, ceramic fiber wool board, phenolic foaming board, glass fiber board, closed cell polyurethane foaming board, opened cell polyurethane foaming board, expandable polystyrene (EPS) foaming board or expandable polyethylene (EPE) foaming board.

The reinforced member 60 or 70 has an excellent rigidity and is made of hard PVC board, PVC composite extrusion board, PS board, ABS board, hardwood board, high density particle board or LVL board.

As shown in FIG. 10, a soundproof door assembly 100 of the present invention for use as a building structure is further disclosed to improve sound isolation qualities. The structural component of the soundproof door assembly 100 comprises the above-mentioned soundproof door 10 (or 15), a doorframe 80 used to support the soundproof door 10 (or 15) and one or more door hinges 90 used to control the soundproof door 10 (or 15) capably to swing relative to the doorframe 80.

The doorframe 80 is a quadrilateral door frame constituted by four components including a header 81, a doorsill 82, a strike jamb 83 and a hinge jamb 84, and each component is an integral structure made of thermoplastic material by extruding forming technique, wooden material or metal material.

Each component of the doorframe 80 is made from hard polyvinyl chloride (PVC) board, foamed PVC board, PVC composite extrusion board, hardwood plate, stainless steel plate, aluminum alloy plate, galvanized and coated steel plate, or calcium silicate plate, and preferably made from hard polyvinyl chloride (PVC) board, foamed PVC board or PVC composite extrusion board.

Figure 11:
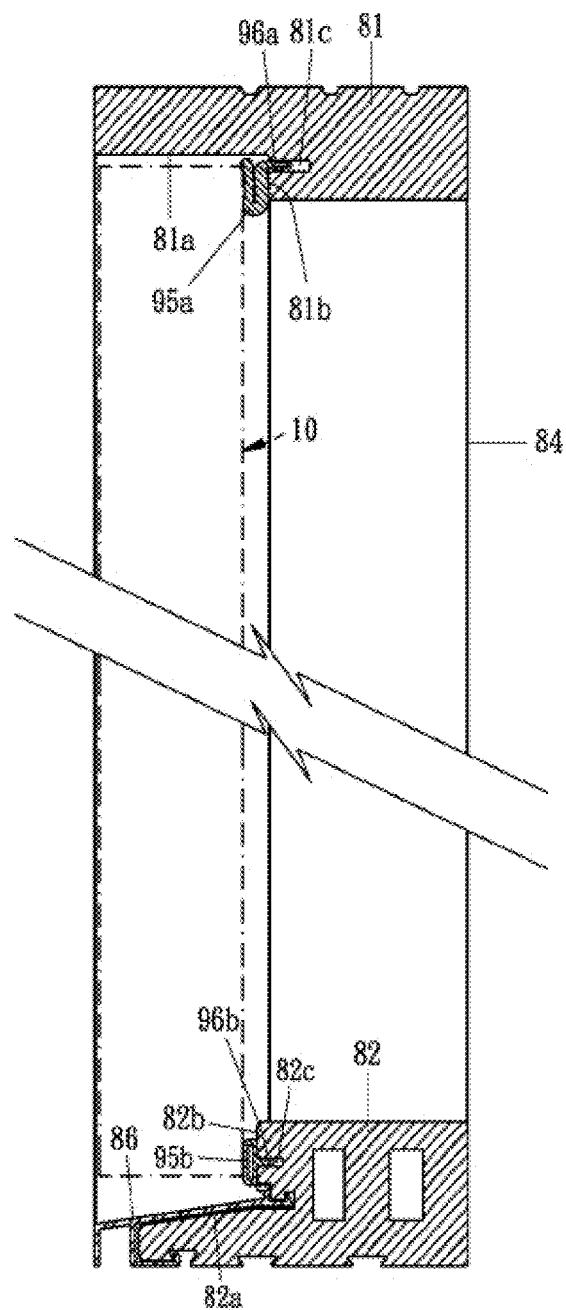
FIG. 11 is a partial enlargement of cross-sectional drawing along line a-a of the soundproof door assembly in FIG. 10.
Figure 12:
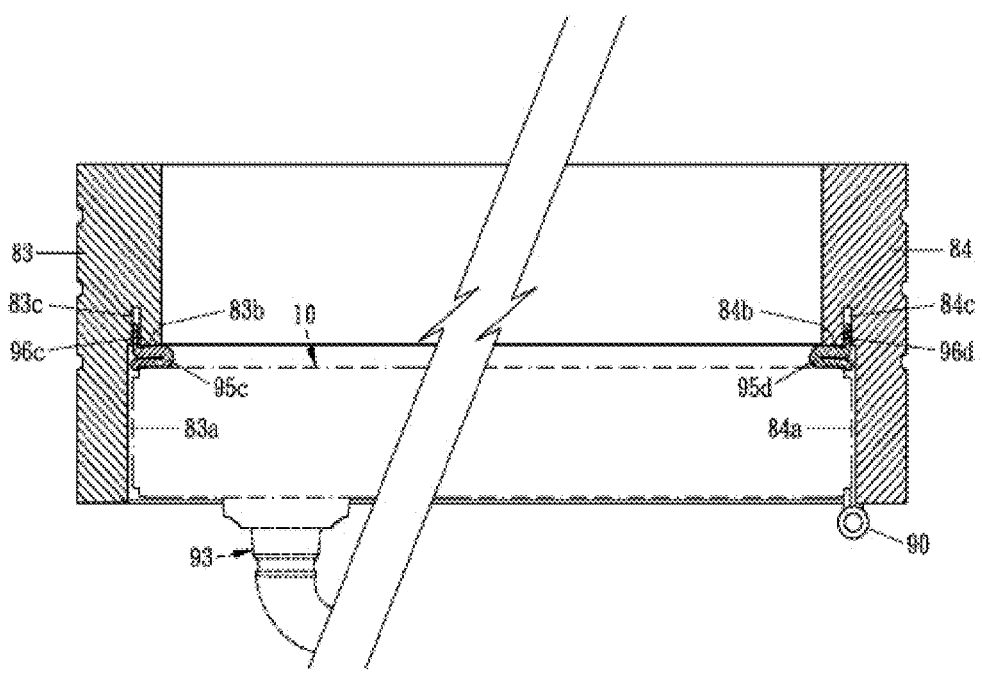
FIG. 12 is a partial enlargement of cross-sectional drawing along line b-b of the soundproof door assembly in FIG. 10.

Referred to from FIG. 10 to FIG. 12, the soundproof door 10 (or 15) of the present invention is a moving part, and the doorframe 80 of the present invention which is positioned proximate the soundproof door 10 (or 15) is a stationary frame. Each door hinge 90 has two long straps, one strap is fastened to the right stile member 24 (or, alternatively, fasten to the left stile member 23) of the soundproof door 10 (or 15) and the other is fastened to the adjacent hinge jamb 84 of the doorframe 80.

And, a doorknob 93 with a latch bolt 93a can be installed to the soundproof door 10 (or 15) through a generally conventional assembling technique so that the doorknob 93 may drive the soundproof door 10 (or 15) operated in either open or close stage.

The soundproof door assembly 100 of the present invention shows a longitudinally cross-sectional structure as shown in FIG. 11. And, the header 81 of the doorframe 80 is provided with a structural arrangement containing a depressed section 81a and a horizontal doorstop 81b, wherein the depressed section 81a is formed to accept the soundproof door 10 (or 15) if closed, and the horizontal doorstop 81b is formed to adjoin to the depressed section 81a to prevent the soundproof door 10 (or 15) from swinging through when closed.

As shown in FIG. 10 and FIG. 11, at the junction where the horizontal doorstop 81b is adjoining to the depressed section 81a of the header 81, an inserted slot 81c is formed along the junction.

Accordingly, a first soft packing strip 95a having a griping-mounting piece 96a is installed onto the header 81 by way of having its griping-mounting piece 96a wholly inserted into the inserted slot 81c, and the first soft packing strip 95 is then positioned into the right place on the outer side of the horizontal doorstop 81b of the header 81.

Further referred to FIG. 11, the doorsill 82 of the doorframe 80 has a depression section 82a in order to accept the soundproof door 10 (or 15) if closed and a protruding ridge 82b formed as a door stop next to the depressed section 82a in order to prevent the soundproof door 10 (or 15) from swinging through when closed.

On the surface of the protruding ridge 82b, an inserted slot 82c is formed thereon. Accordingly, a second soft packing strip 95b having a griping-mounting piece 96b is installed onto the doorsill 82 by way of having its griping-mounting piece 96b wholly inserted into the inserted slot 82c, and the second soft packing strip 95b is then positioned into the right place on the protruding ridge 82b of the doorsill 82.

As shown in FIG. 11, a rain shielding plate 86 made of aluminum alloy or thermoplastic material by extruding forming technique is optionally installed and covered onto the depressed section 82a of the doorsill 82 for preventing water from seeping into the doorsill 82 of the doorframe 80 under stress of weather.

Likewise, the soundproof door assembly 100 of the present invention shows a horizontally cross-sectional structure as shown in FIG. 12. The strike jamb 83 of the doorframe 80 therefore has a depressed section 83a and a longitudinal doorstop 83b, wherein the depressed section 83a is not only provided for a strike plate 94 affixed thereto to match with the latch bolt 93a of the doorknob 93 together as a conventional door lock, but also formed to accept the soundproof door 10 (or 15) if closed, and the longitudinal doorstop 83b is formed to adjoin to the depressed section 83a to prevent the soundproof door 10 (or 15) from swinging through when closed.

As shown in FIG. 10 and FIG. 12, at the junction where the longitudinal doorstop 83b is adjoining to the depressed section 83a of the strike jamb 83, an inserted slot 83c is formed along the junction.

Accordingly, a third soft packing strip 95c having a griping-mounting piece 96c is installed onto the strike jamb 83 by way of having its griping-mounting piece 96c wholly inserted into the inserted slot 83c, and the third soft packing strip 95c is then positioned into the right place on the outer side of the longitudinal doorstop 83b of the strike jamb 83.

Further referred to FIG. 12, the hinge jamb 84 of the doorframe 80 has a depressed section 84a and a longitudinal doorstop 84b, wherein the depressed section 84a is not only provided for one strap of the door hinges 90 affixed thereto, but also formed to accept the soundproof door 10 (or 15) if closed.

At the junction where the longitudinal doorstop 84b is adjoining to the depressed section 84a, an inserted slot 84c is formed along the junction.

Accordingly, a fourth soft packing strip 95d having a griping-mounting piece 96d is installed onto the hinge jamb 84 by way of having its griping-mounting piece 96d wholly inserted into the inserted slot 84c, and the fourth soft packing strip 95d is then positioned into the right place on the outer side of the longitudinal doorstop 84b of the hinge jamb 84.

The soundproof door assembly 100 of the present invention due to having an assembling arrangement as shown in from FIG. 10 to FIG. 12 may achieve a superior sound isolation quality, since there are no clearances existed in between the soundproof door 10 (or 15) and the doorframe 80.

The aforesaid soundproof door 10 or 15 of the present invention has function of sound isolation, and the doorframe 80 as well as those soft packing strip 95a, 95b, 95c and 95d are also excellent in functions of sound isolation. Accordingly, the soundproof door 10 (or 15) if closed to the doorframe 80 will at same time tightly press and touch to the first soft packing strip 95a installed on the header 81, the second soft packing strip 95b installed on the doorsill 82, the third soft packing strip 95c installed on the strike jamb 83 and the fourth soft packing strip 95d installed on the hinge jamb 84 of the doorframe 80. Therefore, the soundproof door assembly 100 of the present invention may effectively minimize the transmission of sound from one side of the soundproof door 10 of 15 to the other side.

The following examples are recited to demonstrate that the soundproof door 10 (or 15) or the soundproof door assembly 100 of the present invention if measured and evaluated for sound transmission class (STC) test has a STC number greater than STC 30 for door (or door assembly), preferably greater than STC 33 for door (or door assembly) or even greater than STC 38 for door (or door assembly), to minimize the transmission of sound at frequency of 500 Hz from one side of the soundproof door 10 (or 15) to the other side.

Sound Transmission Class (STC) Test:

The Sound Transmission Class (STC) is the most common sound reduction measurement in use, which is determined in accordance with both ASTM E413-10(Classification for Rating Sound Insulation) and ASTM E90-90 (Standard Test Method for Laboratory Measurement of Airborne Sound Transmission Loss of Building Partitions and Elements).

Higher STC is generally better to reduction of sound vibration as it travels from one side of a door 10 the other.

EXAMPLE 1

A soundproof door having a total thickness T1 of 45 mm is assembled according to the structural composition shown as FIGS. 4-6.

The door skins 11 and 12 have a thickness of 2 mm and are made of SMC sheet, the quadrilateral frame 20 have a thickness of 41 mm and is made of laminated veneer lumber (LVL) board, and the multiple-layered core 30 comprises the spaced hard-soundproofing cores 40 each having a thickness of 8 mm and made of silicon magnesium board to block sound with high frequency over 500 Hz, the soft-soundproofing core 50 having a thickness of 25 mm and made of rock wool fiber board to block sound with high frequency beneath 500 Hz, and four reinforced members 60 each having a thickness of 25 mm and in parallel set up alongside each side of the soft-soundproofing core 50.

After STC test is determined in accordance with ASTM E413-10 and E90-09, the result is that the soundproof door of the Example 1 has an STC of 38 (or STC 38) for door.

EXAMPLE 2

A soundproof door assembled as the same specification as that of soundproof door of Example 1, in addition to the soft-soundproofing core 50 made of phenolic foaming board used to replace the rock wool fiber board used in Example 1.

After STC test is determined in accordance with ASTM E413-10 and E90-09, the result is that the soundproof door of the Example 2 has an STC 33 for door.

EXAMPLE 3

A soundproof door of Example 1 is mounted to a stationary doorframe positioned proximate the soundproof door via three door hinges and then assembled together as a soundproof door assembly having an assembling arrangement shown as FIGS. 10-12. The stationary doorframe is a quadrilateral door frame made of PVC composite extrusion board, and the quadrilateral door frame has been mounted a loop of soft packing strip used to tightly contact onto the door skin of the soundproof door if closed.

After STC test is determined in accordance with ASTM E413-10 and E90-09, the result is that the soundproof door assembly of the Example 3 has an STC 40 for door.

EXAMPLE 4

Below is the detailed description of a further embodiment of the invention (Example 4). In general, as in FIG. 13, the soundproof door 100 is a sandwich structure with at least five identifiable layers including the front skin and the rear skin 102A and 102B adhesively attached to and sandwiching a core 101. The core 101 has three layers of material. This soundproof door 100 has a total thickness T1 ranged from 30 mm to 80 mm and preferably 44 to 44.5 mm.

For all of the soundproof doors 100 embodying the invention, the skins 102A and 102B thereof are formed from sheet mold compound (SMC) in the form of a plastic skin. During the method by which the SMC skin is produced, one or two layers of fiberglass fabric or braided yarn is or are laid in the cavity of the mold before clinker is applied.

With reference to FIG. 16, the core 101 comprises only one type of materials, a hard soundproof core 101 which may be formed from one or more of the materials such as solid wood board, lumber core board, veneer core plywood, oriented strand board, or boards made of other inorganic materials such as calcium citrate, gypsum, silica, glass fiber and magnesium oxide. There is no soft soundproof core.

The soundproof door 100 also includes reinforcement member 104 which is preferably formed from wood or inorganic materials and provided between the door skins 102A and 102B adjacent the core 101.

A profile made of PVC, ABS, wood, PP and/or PS is provided to close off any raw end to form a seal.

A seal such as Q-ion is provided to offer further strength and isolation.

The soundproof door 10 is used with a door frame which may be formed from wood or plastic, preferably plastic.

Figure 13:
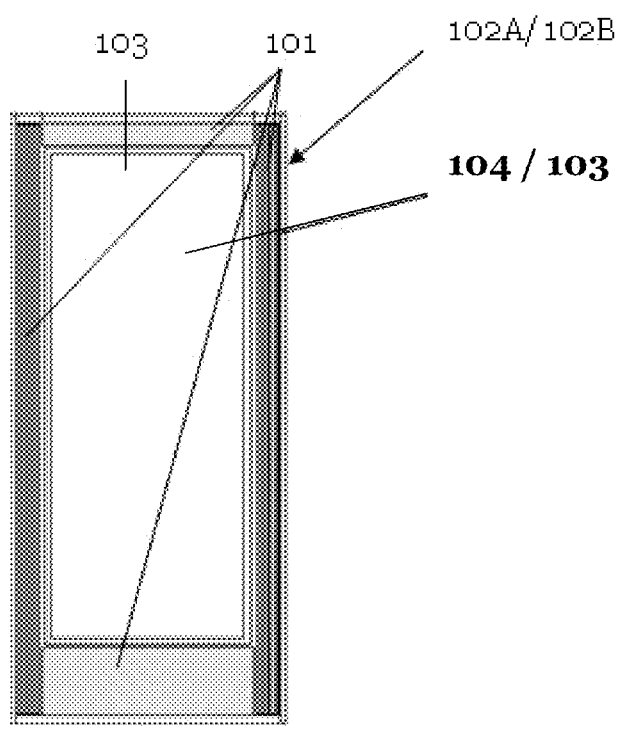
FIG. 13 is a cross-sectional drawing of a soundproof door according to the invention.
Figure 14:
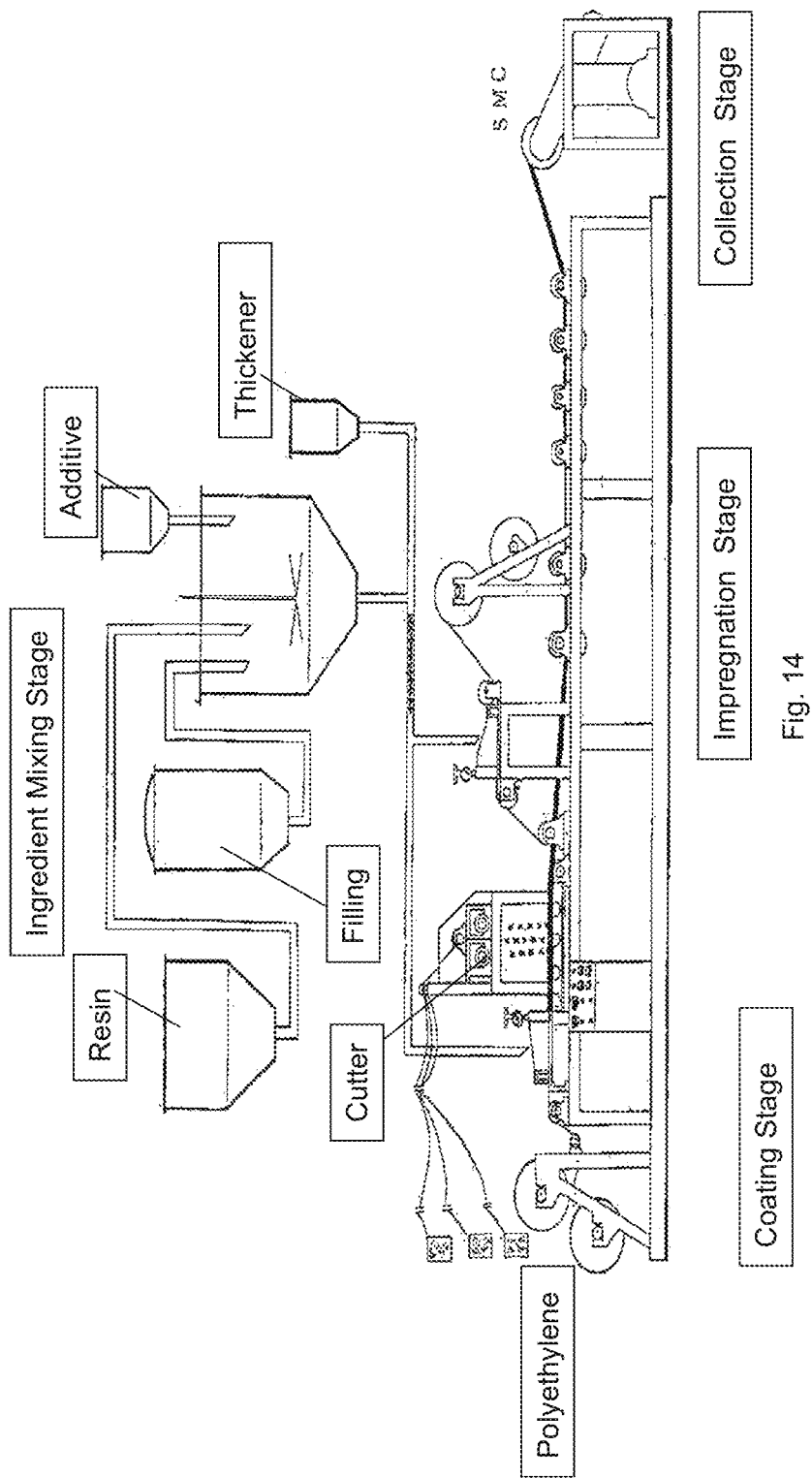
FIG. 14 is a schematic drawings of the process of the formation of SMC.
Figure 15:
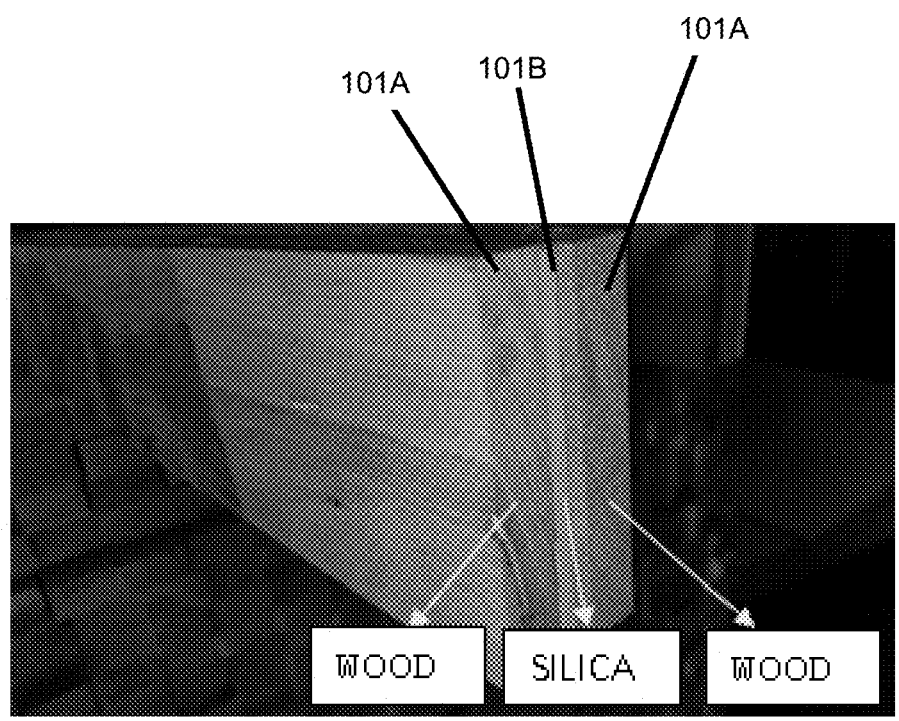
FIG. 15 is a photo showing the core in the soundproof door of FIG. 13.

In more detail, the side-hinged single soundproof door 100 having a total thickness T1 of 44 mm is assembled according to the structural composition shown as FIGS. 13 and 14. In the specific embodiment, the door skins 102A and 102B are each 2.5 mm thick. These door skins 102A and 102B are made of SMC sheet. The door includes an Endura Q825 Q-lon seal. Between the door skins 102A and 102B there is provided a multiple-layered core 101 comprises three layers of hard-soundproofing cores 101A. The multiple-layered core 101 includes two outer hard-soundproofing cores 101A and an inner hard-soundproofing core 101B. The outer hard-soundproofing cores 101A each has a thickness of 15.5 mm and made of hard wood to block sound with high frequency over 500 Hz. The inner hard-soundproofing core 101B is provided between the two outer hard-soundproofing cores 101A. The inner hard-soundproofing core 101B has a thickness of 8 mm and made of silica/calcium citrate board/glass fiber to block sound with high frequency beneath 500 Hz. Reinforcement members 104 may be provided to surround the core 101 to provide further mechanical strength. Profile is used to seal off any raw edges. A seal is provided outside of the profile to offer further insulation. The soundproof door 100 includes a window. The window is occupied by a pane of glass 104 in a preformed aperture 103. The pane of glass 104 may be a Cardinal Laminated Glass LoE 366 secured to the aperture 103 by traditional means.

More specifically, each of the skins 102A and 102B is formed from SMC comprising fiberglass reinforced plastics FRP. The advantage of FRP includes high corrosion resistance. The corrosion resistance increases with resin content. It generally follows that a door formed from FRP with high corrosion resistance would have comparably high weather resistance. High strength also plays a major role in the design of FRP door. It also has very distinct advantage of being low in weight-to-strength ratio. For the same strength, FRP will weight approximately ⅐ as much as steel and half as much as aluminum, which is an important property when considering the cost of transportation and the ease of installation. The versatility and flexibility of FRP allows it to be best for many applications. It can be molded into almost any configurations. In addition, it has good electrical insulation.

The SMC with FRP comprises polyester resin which is preferably unsaturated, cut fiberglass (approximately 20% to 30% by weight with respect to the overall weight of the SMC), tackifier, curing agent, mold release agent, low shrinkage additive (LSA) and low profile additive (LPA). The addition of 0.5-1% of magnesium oxide into the unsaturated polyester resin increases its viscosity to about 18000000 to 20000000 centipoise (cP). The resulting polyester resin is non-stick and flexible. Zinc stearate (also known as the zinc soap) may be used as the mold release agent. The LPA, thermoplastic powder, provides a smooth finishing.

The strength of the FRP, hence the overall SMC, can be manipulated with consideration of the factors including the amount of glass fiber used, the length of individual glass fiber, the direction of the glass fiber, and the diameter of the individual glass fiber. In general, the longer the glass fiber in a specific direction, the greater the stress the resulting FRP can endure in that direction. Also, the smaller the diameter of the glass fiber, the higher the tensile strength of the FRP.

The addition of glass fiber changes the physical properties of the SMC by increasing the tensile strength and bending strength (mPa), the bending coefficient or rigidity, the strength/weight ratio, the impact strength, the usable temperature range of the SMC, the stability in shape-by reducing the thermal expansion coefficient and thermal shrinkage as well as increasing creep resistance, the electrical insulation and thermal conductivity, and the flexibility such that it can be used on different structures.

The glass fiber (in bundles) determines the mechanical properties of the SMC such as tensile strength, flexural strength and impact strength. The resin determines the chemical and electrical properties of the SMC such as weather resistance and electrical insulation. The processing properties such as flow, adhesion and cross-linking curing are determined by the fillers and additives. Filler and additive offer special physical properties such as fire resistance, smooth finishing and costs reduction. They may include Styrene (SM) monomer, hardener, accelerator, tackifier, magnesium oxide, filler (calcium carbonate), color paste, LPA, LSA, fire retardants and UV absorbers etc.

The final SMC clinker has a viscosity of 40000000-80000000 cps.

The production of the SMC is divided into various stages, namely the ingredient mixing stage, the coating stage, the impregnation stage, and the collection stage.

With reference to FIG. 14, during the ingredient mixing stage, the raw materials including the resin, the filler and the additive such as tackifier and color paste are mixed to from a resin mixture. At coating stage, the resin mixture is spread onto the upper and lower polyethylene (PE) membranes. Bundles of glass fibers are cut to about ½ to 2 inch long and are sprinkled onto the resin mixture on one of the, lower, PE membranes, the remaining, upper, PE membrane with resin mixture is placed over the glass fiber and onto the lower PE membrane to form the resin clinker. The glass fibers are sandwiched between the two layers of resin mixtures. The PE membrane reduce vaporization of the styrene monomer (SM) in the resin mixture. This PE membrane can be removed when the resin mixture with glass fibers enters the mold after being cut. During the impregnation stage, the resin clinker is crushed and kneaded to impregnate the glass fiber such that the resin can evenly penetrate the glass fiber. The viscosity of the resin is relative low for full penetration.

The resulting resin clinker is on a first come first use basis and the storage duration is 7 days.

The formation of the skins 102A and 102B involve SMC compression molding. The resin clinker is cut into required shape and size. During molding stage, these cut resin clinkers are placed in the cavity of the mold. The mold is a two-part mold with or without pattern in the mold cavity. When mold parts are pressed together thereby forming a sealed mold cavity, resin clinker therein is heated and pressured so as to force the clinker to take up the shape of the cavity. 2500 tons of pressure is applied to the molds in a hydraulic press for compression molding. Steam or electric wire is used as a heat source to heat the material in the mold and water is used to cool the material down. Repeated heating and cooling is required during the formation. Steam is a preferred heat source due to even heating when compared to electrical wire. For production, the clamp capacity, size of the mold, the daylight and stroke as well as clamp speed are taken into consideration.

The resin clinker is compressed with 2000-2500 tons of pressure and heated at 145-155° C. with steam at 12 Kg/cm² thereby forming the skins 102A and 102B.

The resulting resin clinker is about 116 cm wide.

In summary, the formation of the skins 102A and 102B includes the step of:
1. cutting the resin clinker,
2. weighing the cut resin clinker,
3. blowing the mold to remove impurity,
4. placing the cut resin clinker in specific positions on one part of the mold,
5. pressing the resin clinker in a press at high temperature and high pressure for 90-120 seconds,
6. opening the mold,
7. removing the skin,
8. removing flash and
9. polishing.

The resulting skin 102A and 102B should be of 2.5 mm thickness. To enhance the mechanical properties of the skins 102A and 102B, one or two layers of fiberglass cloth are placed in the mold cavity and are press molded with the resin clinker to form skins 102A and 102B with the preferred thickness of 2.5 mm.

The door skin 102A and 102B can be shaped either as a flat door skin of which soundproof door 100 surface is a flat surface or as a panel door skin of which door surface has decorative panel patterns formed on the door surface. The door skin 102A and 102B may have a smooth surface without wood grain or with imitating wood grain. The door skin 102A and 102B may have a rough back surface for increasing the binding force when they are bond together with the rails and stiles and the core 101A. The skins 102A and 102B are placed on the front and rear sides of the core 101 and are retained thereon by adhesive which may be thermal adhesive or pressure sensitive adhesive.

The viscosity of the clinker should not be below 40000000 cps which will result in air pockets formations and will fail to conceal the fiberglass cloth. When the viscosity is above 80000000 cps, there will be unwanted flow pattern formation.

As mentioned above and with reference to FIG. 16, the core 101 is a layered structure of hard-soundproofing core materials that is collectively surrounded by the reinforcement members 104 which provide mechanical strength and/or rigidity to the core 101. The relative positions of the layers are maintained by adhesion with the aid of adhesive.

Conventional soundproof door 100 with window requires the use of CNC machines to cut out an opening in the skin and the core for accommodating a pane of glass. The cutout is wasted. To streamline the production procedure and to minimize wastage, the skins 102A and 102B are formed with apertures 103A and 103B respectively at molding stage. The mold parts defines, at least the shape and size of, the openings 103A and 103B.

There are two ways of forming an aperture in the core 101. One way of doing so is to cut away a part of the core 101 to form the aperture which is to be aligned with the apertures 103A and 103B in the skins 102A and 102B. A more preferred approach would be to prepare a core structure by sandwiching and adhering a layer of silica or calcium citrate board between two layers of wood. Thereafter the core structure is cut into pieces that are then placed on one of the two skins 102A or 102B to define an aperture 103C in the core 101 while avoiding the apertures 103A of the one skin 102A or 102B. The remaining skin 102A or 102B is then placed over the core 101 with its aperture 103B aligned with the apertures 103C and 103A. A pane of glass is placed in the window 103 and between the skins 102A and 102B when the skins 102A and 102B are adhesively attached to the core 101. Pressure is applied to ensure the adhesion. That way, wastage is minimized.

The pane of glass is preferably Cardinal 366 Laminate Glass/Cardinal Laminated Glass LoE 366.

The resulting soundproof door 100 has a STC of 36 (or STC 36) and OITC 30 in an operable test condition and STC of 37 (or STC 37) and OITC 31 in an inoperable test condition, when evaluated in accordance with ASTM E90-09 (2016), Standard Test Method for Laboratory Measurement of Airborne Sound Transmission Loss of Building Partitions and Elements; ASTM E413-16, Classification for Rating Sound Insulation; ASTM E1332-16, Standard Classification for Rating Outdoor-Indoor Sound Attenuation and ASTM E2235-04 (2012), Standard Test Method for Determination of Decay Rates for Use in Sound Insulation Test Methods.

A sound transmission loss test was initially performed on a filler wall. The soundproof door 100 was removed from the filler wall assembly. The specimen was placed on an isolation pad in the test opening. Duct seal was used to seal the perimeter of the soundproof door 100 to the test opening on both sides. The interior side of the soundproof door 100, when installed, was approximately ¼" from being flush with the receive room side of the filler wall. A stethoscope was used to check for any abnormal air leaks around the soundproof door 100 prior to testing. Operable portions of the soundproof door 100, if any, were cycled at least five times prior to testing.

The Sound Transmission Class (STC) is the most common sound reduction measurement in use, which is determined in accordance with both ASTM E413-10 (Classification for Rating Sound Insulation) and ASTM E90-90 (Standard Test Method for Laboratory Measurement of Airborne Sound Transmission Loss of Building Partitions and Elements). Higher STC is generally better to reduction of sound vibration as it travels from one side of a soundproof door 10 the other.

The soundproof door 100 is also an impact door satisfying the ASTM E1996 test. The impact glass and the specific construction as detailed above both contribute to the impact resistance of the door 100. By comparison, conventional doors with PU foam core would have a relatively lower impact resistance.

After STC test is determined in accordance with ASTM E413-10 and E90-09, the result is that the soundproof door of the Example 4 has an STC of 36 (or STC 36) for door.

The invention has been given by way of example only, and various other modifications of and/or alterations to the described embodiment may be made by persons skilled in the art without departing from the scope of the invention as specified in the appended claims.

The invention claimed is:

1. A soundproof door assembly for use in reduction of sound transmitted from one side of the door to the other side, having an STC number at least STC 36 determined in accordance with ASTM E413-10 and E90-09, comprising:
  a soundproof door having a thickness of 30-80 mm;
  two door skins with one skin formed as a front door skin and the other skin formed as a rear door skin for the soundproof door respectively;
  a quadrilateral frame comprised of a top rail member, a bottom rail member, a left stile member and a right stile member to seal perimeters of the door skins; and
  a multiple-layered core comprised to form a concrete inner portion of the door, the core comprising three layers of a hard-soundproof material and comprised to block sound at a high frequency of over 500 Hz;

the three layers comprising first and second layers sandwiching a third layer, the first and second layers comprise solid wood and the third layer comprises calcium citrate board, the layers are fixed to each other.

2. The soundproof door assembly as claimed in claim 1, wherein the soundproof door has a thickness of 44-45 mm.

3. The soundproof door assembly as claimed in claim 1, wherein the third layer has a thickness of 8 mm.

4. The soundproof door assembly as claimed in claim 1, wherein each of the door skins has a thickness of 2.5 mm.

5. The soundproof door assembly as claimed in claim 1, wherein the hard-soundproofing core is of a material selected from a group consisting of solid wood, lumber, veneer core plywood, oriented strand board, calcium citrate, gypsum, silica, glass fiber and magnesium oxide.

6. The soundproof door assembly as claimed in claim 1, wherein the first and second layers are made of a same material.

7. The soundproof door assembly as claimed in claim 1, further comprising a reinforcement member provided with the core for enhancing mechanical strength of the overall door.

8. The soundproof door assembly as claimed in claim 1, wherein each of the door skins includes an aperture aligned and devoid of any soundproofing core thereby forming a window of the soundproof door for accommodation of a glass pane.

9. The soundproof door assembly as claimed in claim 8, wherein the aperture accommodates a pane of glass.

10. The soundproof door assembly as claimed in claim 9, wherein the pane of glass comprises Cardinal Laminated Glass LoE 366.

11. The soundproof door assembly as claimed in claim 1, wherein the front and rear door skins comprise resin.

12. The soundproof door assembly as claimed in claim 11, wherein the resin comprise polyester resin.

13. The soundproof door assembly as claimed in claim 12, wherein the polyester resin comprises unsaturated polyester resin.

14. The soundproof door assembly as claimed in claim 13, wherein the unsaturated polyester resin comprises fiberglass reinforced plastic.

15. The soundproof door assembly as claimed in claim 11, wherein the resin includes at least one layer of fiberglass cloth.

16. The soundproof door assembly as claimed in claim 1 being an impact door satisfying the ASTM E1996 test.

17. The soundproof door assembly as claimed in claim 1, wherein each of the first and second layers has a thickness of 15.5 mm.

18. The soundproof door assembly as claimed in claim 1, wherein the door does not include an aperture for a window.

* * * * *